Oct. 31, 1944.  R. PELLATON  2,361,563
DEVICE FOR MEASURING TIME INTERVALS
Filed March 24, 1942  2 Sheets-Sheet 1

Inventor
R. Pellaton

Oct. 31, 1944.    R. PELLATON    2,361,563
DEVICE FOR MEASURING TIME INTERVALS
Filed March 24, 1942    2 Sheets-Sheet 2
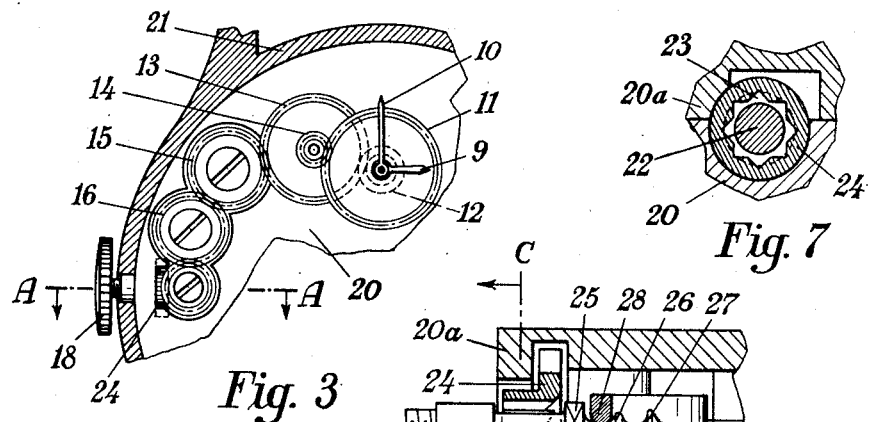
Fig. 3
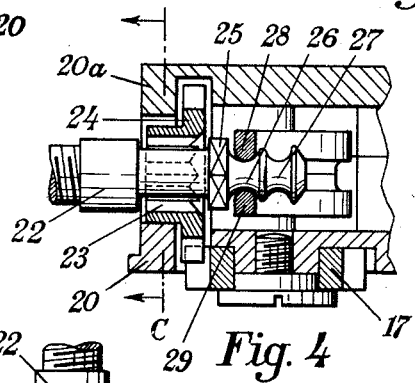
Fig. 7
Fig. 4
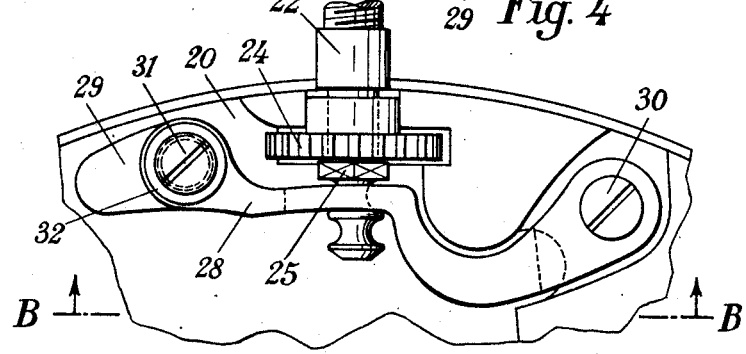
Fig. 5
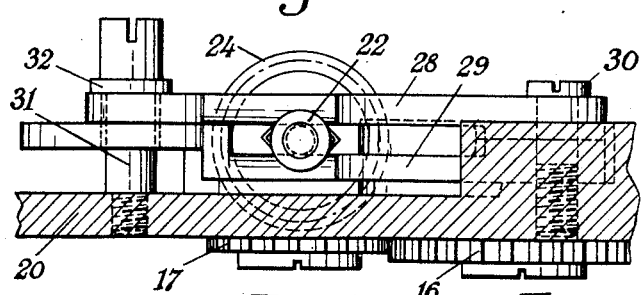
Fig. 6
Inventor
R. Pellaton
By Glascock Downing Liebole
Attys.

Patented Oct. 31, 1944

2,361,563

UNITED STATES PATENT OFFICE 2,361,563

DEVICE FOR MEASURING TIME INTERVALS

Raoul Pellaton, Les Ponts de Martel, Switzerland, assignor to Manufacture des Montres Universal Perret et Berthoud S. A., Geneva, Switzerland, a firm of Switzerland Application March 24, 1942, Serial No. 436,048
In Switzerland November 6, 1940

3 Claims. (Cl. 58—57)

The present invention relates to a watch of the type having a device for measurement of time intervals.

It is the object of the invention to provide a device independent of the movement for indicating the moment of starting the measurement of time intervals. A further object of the invention consists in the improved construction and arrangement of the operating means of said device as will be apparent from the following description and claims, reference being had to the accompanying drawings which show a preferred embodiment of the invention.

In the drawings:

Fig. 3 is a detail top plan view of the watch without dial.

Fig. 4 is an enlarged sectional view taken on the line A—A in Fig. 3.

Fig. 5 is a detail plan view on an enlarged scale showing parts of the operating means according to the invention.

Fig. 6 is a sectional view taken on the line C—C in Fig. 5, and Fig. 7 is a sectional view taken on the line B—B in Fig. 3.

Figure 1:
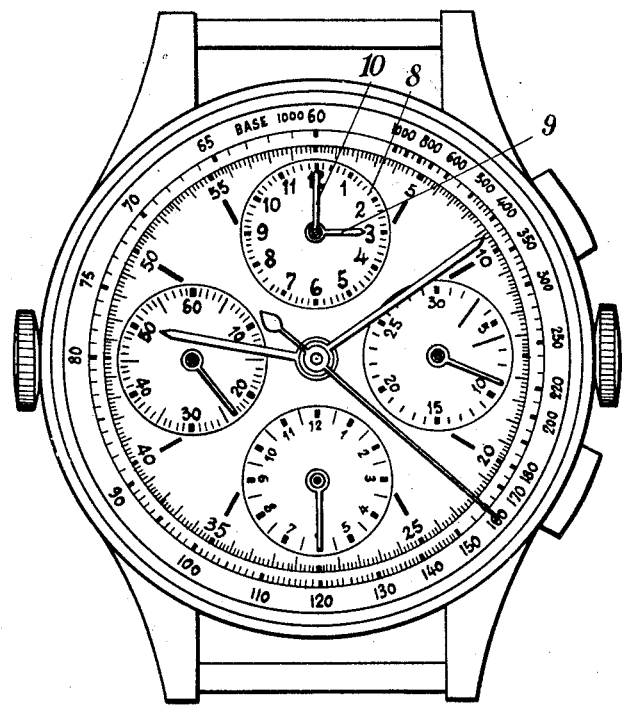
Fig. 1 is a top plan view showing the watch to which the invention is applied.
Figure 2:
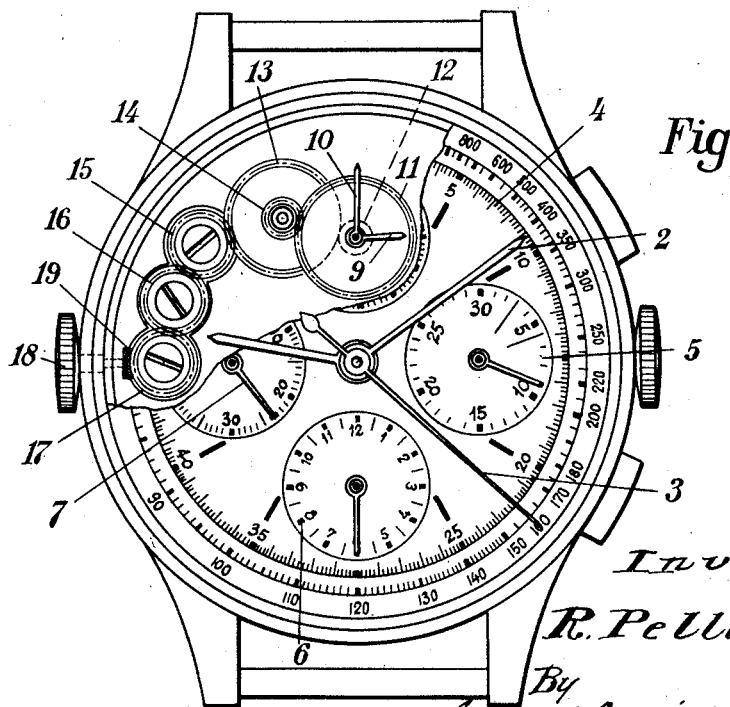
Fig. 2 is a similar view, a part of the dial being cut away to show constructional features.

The embodiment represented in Figs. 1 to 2 is composed of a wrist watch having a chronograph and a counter mechanism for the minutes and hours. 1, 2 and 3 are the usual hands cooperating with the ordinary hour scale 4. 5 is the small dial for the minutes counting device and 6 the dial for the hours counting device. 7 is the usual seconds hand. The dial comprises further a small dial provided with an additional hour scale 8 with which are shown cooperating two hands 9 and 10 indicating the first the hours and the second the minutes. The said two hands are independent of the movement; the first is fixed to the tube of a toothed wheel 11 turning freely on the tube of a pinion 12, which tube has fixed thereto the minutes hand and is mounted to turn on an axle fast with the movement plate 20. On one side of said tube wheels is disposed a movable organ formed by a wheel 13 and a pinion 14; the latter meshes with the wheel 11 while the wheel 13 is shown meshing, on the one side, with the pinion 12, and, on the other side, with an intermediate wheel 15 connected by means of another intermediate wheel 16 with the crown wheel 17. 18 is a crown rotatably mounted on the watch on the exterior thereof and whose axis, which is parallel to the mounting plate 20, carries a pinion 19 meshing with the crown wheel 17 whose plane is parallel to the plane of the mounting plate.

When it is desired to measure the time by means of the chronograph hand 3 and the minutes and hours counting devices 5 and 7, the hands 9 and 10 are first displaced by means of the crown 18 so as to indicate the moment of starting the time measurement, and are then released in the attained position in which they will be kept until a new operating of the crown takes place. In this way, the time measure will be completed by the indication of the time of starting the measurement.

Referring now to the Figures 3 to 6, the numeral 20 indicates the mounting plate; 20a is a bridge and 21 the case band; on the outside of the latter, there is disposed the crown 18 which is shown acting through gears 13 to 17 mounted on the said plate upon the wheel 11 and the pinion 12 carrying the first the hours hand 9 and the latter the minutes hand 10, whereby said hands which are intended for measurement of determined times turn about a special hour scale not represented.

The crown 18 is fixed upon a shaft 22 which extends through a central hole 23 provided in the hub of a pinion 24. The latter is in gear with the above mentioned gear 17. As shown in Fig. 7, the hole is of polygonal shape. The shaft 22 presents a portion 25 which is in the form of a straight prism and followed by two circular grooves 26 and 27. The said grooves are adapted to cooperate with elastic pincers formed by two spring blades 28 and 29 carried by the mounting plate 20; the said blades are fixed at one end to the plate by means of the screw 30, while the other ends thereof are shown having eyes engaging a fitting surface of the screw 31 which is also screwed into the mounting plate. The second end of the spring blade 28 bears constantly against a shoulder 32 of said screw, the spring 28 being thus in a fixed relation. The second end of the spring blade 29, however, can be displaced freely in transverse direction alongside the fitting surface of the screw 31.

In the position of rest represented in Fig. 4, the prism 25 which constitutes the male half of a coupling is out of engagement with the hole 23 in the pinion 24, which hole is shown forming the female half of said coupling. Thus, on turning the crown 18, the hands 9 and 10 will not be operated; the shaft is maintained in this uncoupled position by the pincers 28—29 engaging the groove 26; for operating the hands 9 and 10, for instance for resetting them to zero at the beginning of measuring a time interval, the crown 18 is to be drawn towards the exterior. The prism 25 then penetrates into the hole 23 and the crown will be coupled to the movement transmitting mechanism connected with the hands; the shaft will be maintained in this new or coupling position by the pincers 28—29 engaging the groove 27.

The invention is not limited to the examples represented in the drawings; in particular the operating crown 18 could be replaced by another member, e. g., a rotatable bezel.

I claim:

1. The combination with a watch having the usual hour scale, hour and minute hands and a winding stem, of an additional hour scale, two coaxial hands cooperating with said additional scale and indicating the first the hours and the second the minutes, said coaxial hands being independent of the movement of the first mentioned hour and minute hands, a movement transmission mechanism common to both said coaxial hands and comprising a pinion having a hollow hub, the hole of said hub being of polygonal shape, so as to form the female half of a disengaging coupling, a shaft extending through said hole and being slidable longitudinally, said shaft having a prismatic portion forming the male half of said coupling for cooperating with said female half upon sliding said shaft, an operating crown carried by said shaft, and an elastic device adapted to maintain the said shaft in a coupled and released position, respectively, whereby upon operating said crown, the two coaxial hands are brought into a position for indicating the moment of starting the measurement of time intervals.

2. The combination with a watch having the usual hour scale, hour and minute hands and a winding stem, of an additional hour scale, two coaxial hands cooperating with said additional scale and indicating the first the hours and the second the minutes, said coaxial hands being independent of the movement of the first mentioned hour and minute hands, a movement transmission mechanism common to both said hands and comprising a pinion having a hollow hub, the hole of said hub being of polygonal shape so as to form the female half of a disengaging coupling, a shaft extending through said hole and being slidable longitudinally, said shaft having two circular grooves disposed adjacent each other and a prismatic portion forming the male half of said coupling for cooperating with said female half upon sliding said shaft, an operating crown carried by said shaft, and elastic pincers adapted to engage either the one or the other of said grooves for maintaining said shaft in a coupled and released position, respectively, whereby upon operating said crown, the two coaxial hands are brought into a position for indicating the moment of starting the measurement of time intervals.

3. The combination with a watch having the usual hour scale, hour and minute hands and a winding stem, of an additional hour scale, two coaxial hands cooperating with said additional scale and indicating the first the hours and the second the minutes, said coaxial hands being independent of the movement of the first mentioned hour and minutes hands, a movement transmission mechanism common to both said coaxial hands and comprising a pinion having a hollow hub, the hole of said hub being of polygonal shape so as to form the female half of a disengaging coupling, a shaft extending through said hole and being slidable longitudinally, said shaft having two circular grooves disposed adjacent each other and a prismatic portion forming the male half of said coupling for cooperating with said female half upon sliding said shaft, and elastic pincers adapted to engage either the one or the other of said grooves for maintaining said shaft in a coupled and released position, respectively, one branch of said pincers being formed by a fixed spring blade and the other branch by a spring blade extending parallel to the fixed blade and having one end secured to the watch while the other end thereof is displaceable in transverse direction, whereby upon operating said crown, the two coaxial hands are brought into a position for indicating the moment of starting the measurement of time intervals.

RAOUL PELLATON.